US008639804B2

(12) United States Patent
Ramanathaiah et al.

(10) Patent No.: US 8,639,804 B2
(45) Date of Patent: Jan. 28, 2014

(54) TECHNIQUES FOR MAINTAINING CURRENT CONTENT

(75) Inventors: Gurudutta Ramanathaiah, Bangalore (IN); Ranjani Manchikanti, Dilsukhnagar Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 505 days.

(21) Appl. No.: 12/874,554

(22) Filed: Sep. 2, 2010

(65) Prior Publication Data
US 2012/0059929 A1 Mar. 8, 2012

(51) Int. Cl.
*G06F 15/16* (2006.01)

(52) U.S. Cl.
USPC ............ 709/224; 709/218; 709/228

(58) Field of Classification Search
USPC .......... 709/217–219, 220, 224, 228
See application file for complete search history.

(56) References Cited

U.S. PATENT DOCUMENTS

| | | | |
|---|---|---|---|
| 6,061,715 A | 5/2000 | Hawes | |
| 6,101,510 A | 8/2000 | Stone et al. | |
| 6,253,204 B1 * | 6/2001 | Glass et al. ................ | 1/1 |
| 6,275,858 B1 | 8/2001 | Bates et al. | |
| 6,738,804 B1 * | 5/2004 | Lo .................................. | 709/219 |
| 7,024,630 B2 | 4/2006 | Himmel et al. | |
| 7,454,461 B2 * | 11/2008 | Punaganti Venkata et al. ........................... | 709/203 |
| 7,487,455 B2 | 2/2009 | Szeto | |
| 7,631,076 B2 * | 12/2009 | Cannon et al. ............... | 709/225 |
| 7,640,512 B1 * | 12/2009 | Appling ....................... | 715/771 |
| 7,747,706 B2 * | 6/2010 | Ran .............................. | 709/219 |
| 7,805,338 B2 * | 9/2010 | Kolls ........................... | 715/799 |
| 7,941,542 B2 * | 5/2011 | Broda et al. .................. | 709/227 |
| 2004/0054650 A1 * | 3/2004 | Chun ............................. | 707/1 |
| 2005/0025184 A1 * | 2/2005 | Dowling et al. .............. | 370/469 |
| 2005/0033821 A1 * | 2/2005 | Shin et al. .................... | 709/217 |
| 2007/0033588 A1 * | 2/2007 | Landsman ..................... | 717/178 |
| 2007/0211674 A1 * | 9/2007 | Ragnar Karlberg et al. .. | 370/338 |
| 2008/0301670 A1 * | 12/2008 | Gouge et al. ................. | 709/203 |
| 2011/0265152 A1 * | 10/2011 | Kestenbaum ................ | 709/219 |

OTHER PUBLICATIONS

Anonymous, "27 Tools-in-1 Wichio Browser," 2008 [retrieved on Aug. 23, 2010]. Retrieved from the Internet:< URL:http://www.daolnwod.com/27-tools-in-1-wichio-browser.html>.
Anonymous, "Page Reboot: Automatically Refresh Any Website," 2008 [retrieved on Aug. 23, 2010]. Retrieved from the Internet:< URL: http://www.pagereboot.com>.
My Digital Life, "Firefox Add-Ons: ReloadEvery to Refresh Websites at Predefined Intervals," 2009 [retrieved on Aug. 23, 2010]. Retrieved from the Internet:< URL: http://www.mydigitallife.info/firefox-add-ons-reloadevery-to-refresh-websites-at-predefined-intervals/>.
Reyes, et al., "Tab Mix Plus 0.3.8.2," 2009 [retrieved on Aug. 23, 2010]. Retrieved from the Internet:< URL: https://addsons.mozilla.org/en-US/firefox/addon/122>.

* cited by examiner

*Primary Examiner* — Patrice Winder
(74) *Attorney, Agent, or Firm* — Kilpatrick Townsend & Stockton LLP

(57) ABSTRACT

Techniques, including systems and methods, for maintaining current content are described and suggested herein. In an embodiment, information from a plurality of information sources is received. Communications between the computer system and a network are monitored. Subsequent to an inability to communicate over the network, an ability to communicate over the network is detected. Responsive to detecting the ability to communicate over the network, information from one or more of the information sources is requested. The one or more information sources may be servers providing web pages.

20 Claims, 6 Drawing Sheets

| Browser Window | Tab | Refresh |
|---|---|---|
| 1 | 1 | Yes |
| 1 | 2 | No |
| 3 | 1 | Yes |
| 5 | 1 | Yes |
| 5 | 2 | No |
| 5 | 3 | No |
| 5 | 4 | No |
| 6 | 1 | No |
| 7 | 1 | Yes |

TECHNIQUES FOR MAINTAINING CURRENT CONTENT

BACKGROUND OF THE INVENTION

Browsers and other applications provide convenient tools for viewing information provided from various information sources. For instance, a user may utilize a browser in order to view web pages, the content of which may be provided by a third party web server or by a system of the user's own organization. In many cases, content provided by information sources is static. In such instances, requests are made to information sources and the information sources usually provide content responsive to the requests, such as the content of a web page. Once content responsive to the requests is sent by an information source, generally additional content is not sent unless another request is made pursuant to user input that indicates a desire to make another request, such as user selection of a "refresh" button in a browser. As a concrete example, a user may select a hyperlink to a news article. The user's browser requests the news article, receives the article, and displays the article to the user. The news article is not updated at the user's device unless the user provides appropriate input, such as by selecting a "refresh" button.

In many cases, however, content provided by information sources is dynamic. In such instances, a user may request content from an information source and the information source may send updated information several times, perhaps indefinitely. A browser, or other application, may receive user input that indicates a desire to request content and, once the content is received, the browser or other application may periodically request updated content. As an example, a user may use a browser to view the current price of stocks in his or her portfolio. Web pages that display stock prices are often configured such that the user's browser periodically requests updates of the stock prices without the user having to provide additional input, such as selection of a "refresh" button of the browser. In this manner, the user is provided current prices with little effort on behalf of the user.

A computing device's communication with a network, however, can be interrupted for various reasons. A digital subscriber line (DSL) or cable modem, for instance, may malfunction. The computing device itself may malfunction. A server or other information source may experience a temporary outage whereby it temporarily does not respond to requests or may not be able to communicate with another server that provides content necessary for responding to requests. Such interrupted communication can be problematic for dynamic content. For instance, a web page configured to automatically refresh or otherwise request updated content may cease requesting updated content if one of its requests is unsuccessful. Typically, the updating of dynamic content ceases whenever communication with a network is interrupted and content is not updated absent user intervention, such as by selecting a "refresh" button of a browser.

Modern browsers and other applications provide ways for users to have simultaneous access to multiple information sources, many of which may provide content dynamically. Users, for instance, may open several instances of a browser in order to simultaneously have access to multiple web pages. Many browsers include a tab feature where a single instance of a browser may be used to simultaneously have access to content of multiple web pages. A user may select corresponding tabs displayed in connection with the browser in order to cause display of corresponding content that has been received by the user's computing device. Because of the ease with which multiple information sources can be accessed simultaneously, users at any given time may have simultaneous access to multiple information sources. However, if a user's device experiences interrupted communication with a network, the user may have to manually update content for dynamic content that has stopped being updated due to the interrupted communication. If a user uses the aforementioned tools of browsers and other applications in order to have simultaneous access to multiple instances of content, manually updating content can be quite burdensome.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments of the present invention provide techniques, including systems and methods, for maintaining content current. For instance, in one example, a browser application is used to simultaneously have access to a plurality of web pages. Separate browser windows and/or multiple tabs of a browser window may be used. When a network glitch (a temporary inability to communicate with another device over a network) is determined to be resolved, one or more of the web pages are refreshed. In this manner, users do not need to manually reload web pages that ceased to automatically update themselves due to the network glitch.

In one embodiment, a computer-implemented method of maintaining current content is disclosed. The method includes receiving, by a computer system, information from a plurality of information sources; monitoring communications between the computer system and a network; detecting, by the computer system and based at least in part on the monitoring, an ability to communicate over the network subsequent to an inability to communicate over the network; responsive to detecting the ability to communicate over the network, requesting information from one or more of the information sources.

The information sources may include at least one server operating a web page. The method may further include detecting the inability to communicate over the network. Monitoring the ability of the computer system to communicate over the network may include periodically polling the computer system. The method may also include detecting, by the computer system, the inability to communicate over the network. Periodically polling the computer system may include polling the computer system at a first rate until detection of the inability to communicate over the network and, responsive to detecting the inability to communicate over the network, polling the computer system at a second rate that is higher than the first rate. In addition, the method may also include detecting, by the computer system, the inability to communicate over the network; determining whether a set of conditions for stopping polling of the computer system are fulfilled; and when the set of conditions are fulfilled, ceasing polling the computer system. In one embodiment, the one or more information sources include a plurality of information sources, and receiving the information from the one or more information sources includes receiving information for each of a plurality of content units. The method may further comprise identifying a subset of the content units to be refreshed upon restoration of a network failure; and wherein requesting information from the one or more information sources includes requesting information solely for the members of the subset.

In accordance with another embodiment, a computer-readable storage medium having stored thereon instructions that cause a computer system to maintain current content is disclosed. The instructions comprise: instructions that cause the one or more computer systems to utilize a network to access information from a plurality from one or more information sources; instructions that cause the computer system to detect an ability to communicate over the network subsequent to an inability to communicate over the network; instructions that cause the computer system to, responsive to detecting the ability to communicate over the network, request information from one or more of the information sources.

The information sources may include at least one server operating a web page. The computer-readable storage medium may further comprise instructions that cause the computer system to detect the inability to communicate over the network. Also, the computer-readable storage medium may comprise instructions that cause the computer system to monitor an ability to communicate using the network by periodically polling the computer system. Further, the computer-readable storage medium may include instructions that cause the computer system to detect the inability to communicate over the network, where periodically polling the computer system includes polling the computer system at a first rate until detection of the inability to communicate over the network and, responsive to detecting the inability to communicate over the network, polling the computer system at a second rate that is higher than the first rate.

In an embodiment, the computer-readable storage medium further comprises instructions that cause the computer system to detect the inability to communicate over the network; instructions that cause the computer system to determine whether a set of conditions for stopping polling of the computer system are fulfilled; and instructions that cause the computer system to, when the set of conditions are fulfilled, cease polling the computer system. The one or more information sources may include a plurality of information sources, where the instructions that cause the computer system to access the information from the one or more information sources include instructions that cause the computer system to receive information for each of a plurality of content units, and where the computer-readable storage medium further comprises instructions that cause the computer to identify a subset of the content units to be refreshed upon restoration of a network failure; and where the instructions that cause the computer system to request information from the one or more information sources include instructions that cause the computer to request information solely for the members of the subset.

In yet another embodiment, a computer system configured to maintain current content is disclosed. The computer system includes one or more processors and memory including executable instructions that, when executed by the one or more processors, cause the one or more processors to at least: utilize a network to access information from a plurality of information sources; detect an ability to communicate over the network subsequent to an inability to communicate over the network; responsive to detecting the ability to communicate over the network, request information from one or more of the information sources.

The information sources may include at least one server operating a web page. The memory may further comprise executable instructions that cause the one or more processors to monitor an ability to communicate using the network by periodically polling the computer system. Also, the memory may further comprise executable instructions that cause the one or more processors to detect the inability to communicate over the network, where periodically polling the computer system includes polling the computer system at a first rate until detection of the inability to communicate over the network and, responsive to detecting the inability to communicate over the network, polling the computer system at a second rate that is higher than the first rate.

In an embodiment, the memory further includes: instructions that cause the computer system to detect the inability to communicate over the network; instructions that cause the computer system to determine whether a set of conditions for stopping polling of the computer system is fulfilled; and instructions that, when the set of conditions are fulfilled, cause the computer system to cease polling the computer system. The one or more information sources include a plurality of information sources. Various other variations of the method, computer-readable storage medium, and computer system are contemplated as being within the spirit of the present disclosure.

For a fuller understanding of the nature and advantages of the present invention, reference should be made to the ensuing detailed description and accompanying drawings.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

As noted, embodiments of the present disclosure include techniques for maintaining current content. In one example, a browser application is used to simultaneously provide access to a plurality of web pages. Separate browser windows and/or multiple tabs of a browser window may be used to allow a user to select which accessed content is currently displayed on a screen. Accessing the content using the browser application may be a dynamic process where content is updated to maintain a current state. When a network glitch (a temporary inability to communicate with another device over a network) is determined to be resolved, one or more of the web pages are refreshed. All of the web pages may be refreshed or a subset of the web pages, such as web pages having dynamic content, may be refreshed. In addition, portions of web pages may be refreshed, such as portions inside of HTML frames or other portions that may contain dynamic content. In this manner, users do not need to manually reload web pages that ceased to automatically update themselves due to the network glitch.

Figure 1:
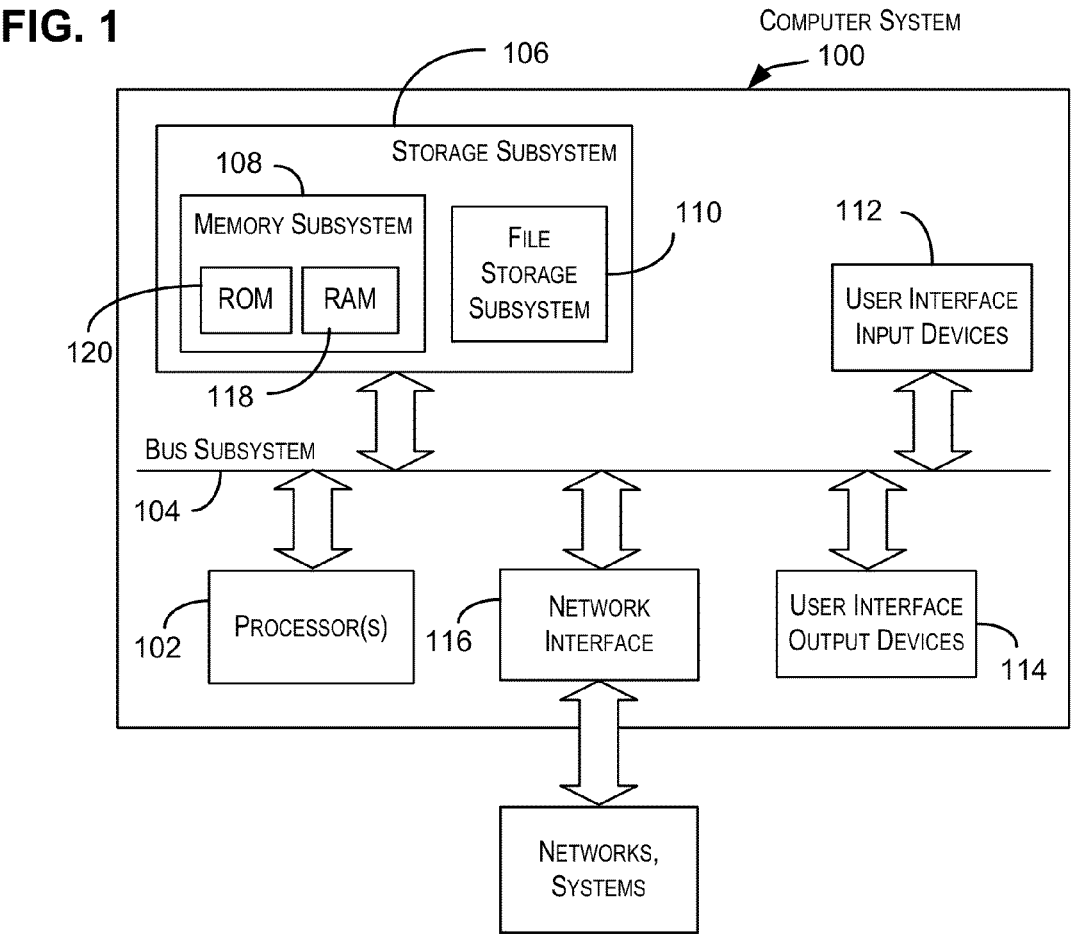
FIG. 1 is a simplified block diagram of a computer system that may be used to practice an embodiment of the present invention.

FIG. 1 is a simplified block diagram of a computer system 100 that may be used to practice an embodiment of the present invention. For instance, a browser application may execute on the computer system 100 using the various components described below. In an embodiment, the computer system 100 serves as a processing system and/or a client system depicted in FIG. 2. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100. Network interface subsystem 116 may be used to communicate with a network to request and receive web pages and/or other content.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device to interact with a browser or other application's interface in order to request web pages or other content.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Web page and other content may be displayed to users using one or more output devices.

Storage subsystem 106 provides a computer-readable medium for storing the basic programming and data constructs that provide the functionality of the present invention. Software (programs, code modules, instructions) that, when executed by a processor, provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, a server or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
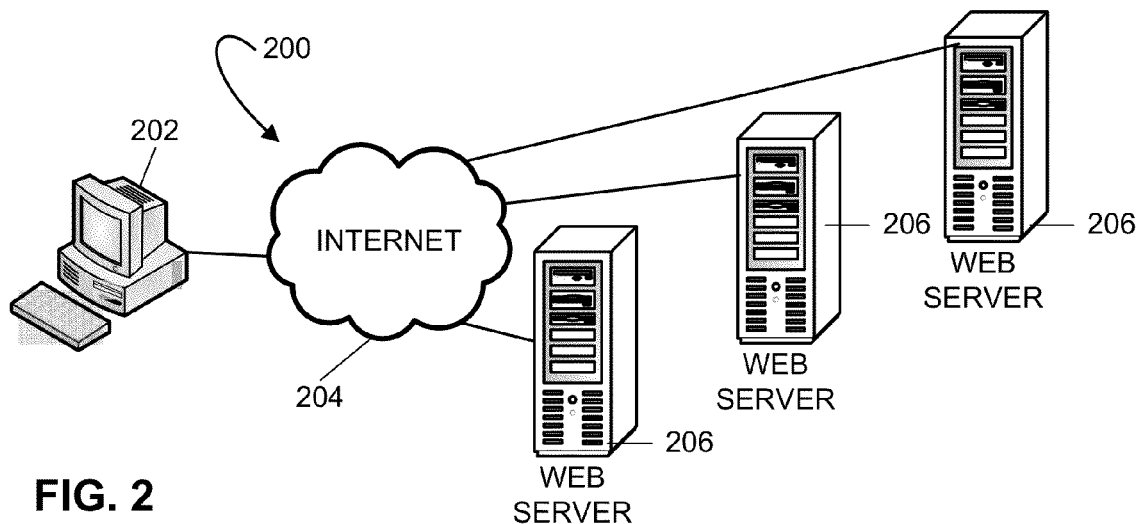
FIG. 2 shows an environment in which the invention may be practiced in accordance with an embodiment.

FIG. 2 shows an environment 200 in which embodiments of the invention may be practiced. Components of the environment may utilize computer systems, such as the computer system described above, or variations thereof. As shown in the drawing, the environment 200 includes a client device 202 that communicates over the Internet 204 or another communications network with a plurality of web servers 206. In an embodiment the client device sends requests to each of the web servers 206 and the web servers 206 respond to the request with content that is responsive to the requests. As an example, if a user of a client device 202 types a uniform resource locator (URL) into a browser application that is executing on the client device 202, a request is routed over the Internet from the client device 202 to a web server 206 that is able to respond to the request 202 with content corresponding to the URL entered by the user. As another example, if a user selects, through a browser application, a hyperlink included with content displayed by the browser application, a request for corresponding content is routed over the Internet from the client device 202 to a web server 206 that is able to respond to the request 202 with content corresponding to the URL of the hyperlink selected by the user.

As discussed above, the client device 202 may request and receive content from multiple web servers 206, such as when simultaneously viewing or at least having access to several web pages. It should be noted that the environment 200 is provided for the purpose of illustration and other environments and variations of the environment 200 are considered as being within the scope of the present invention. For example, the client device 202 is shown in FIG. 2 as being in a desktop computer system, but the client device 202 may be any suitable computing device, such as a notebook computer system, a tablet computer system, a mobile device, or generally any computing device able to access content utilizing a network. In addition, while FIG. 2 shows a plurality of web servers, generally content may be provided from various information sources, such as application servers, other client devices, and generally any computing device able to provide content to the client device 202 over a network. Similarly, while FIG. 2 shows the Internet as a communication network utilized by the client device 202 and the web server 206, other networks may be used in addition to or as an alternative to the Internet 204. For example, mobile networks, which may or may not utilize the Internet for communication, may be used.

Figure 3A:
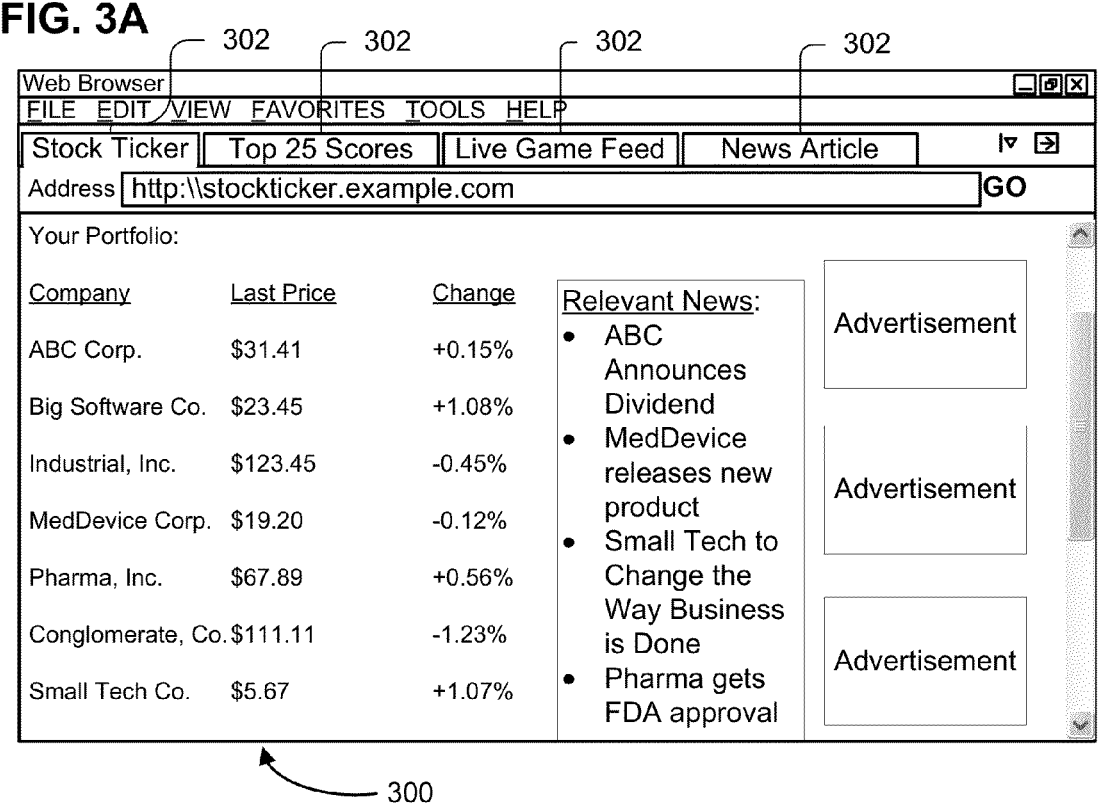
FIGS. 3A-3B show views of a presentation surface of a browser application that utilizes a tab feature, in accordance with an embodiment.

FIG. 3A shows an illustrative example of a presentation surface of a browser application 300 which may be used in connection with practicing various embodiments of the invention. A presentation surface is a virtual area used by an application for display. Example presentation surfaces include windows. Presentation surfaces are often referred to as presentation canvases. Presentation surfaces may be displayed on a display of a user devices, although presentation surfaces are often hidden from view, at least temporarily, to provide for display of other presentation surfaces. When displayed, a presentation surface occupies a portion of a display of a device. An application may utilize a single presentation surface or multiple presentation surfaces. For example, some browser applications allow users to access multiple web pages using a single presentation surface and multiple tabs, using multiple presentation surfaces, or a combination of multiple presentation surfaces, one or more of which have multiple tabs. Examples are provided below.

As shown in FIG. 3A, the browser application 300 includes a plurality of tabs 302. As used herein, a tab is a navigational control for controlling display of content of a corresponding document. In the example shown in FIG. 3A for instance, a "stock ticker" tab is shown in connection with a web page that shows current stock prices for a plurality of companies. In this example, the stock ticker tab corresponds to a hypertext markup language (HTML) document that was sent to a user device on which the browser 300 is being executed. Likewise, FIG. 3A shows a "Top 25 Scores" tab which may correspond to an HTML document used to display current scores for sporting events. FIG. 3A shows a "Live Game Feed" tab which may correspond to an HTML document used to show a current status or even video of a sporting event. A "News Article" article tab shown in FIG. 3A may correspond to an HTML document that includes content of a particular news article. While HTML documents are used for the purpose of illustration, tabs may correspond to other types of documents, as well. Examples include extensible markup language (XML) documents, audio files, video files, documents used in connection with word processing applications, and generally any suitable document.

As shown in FIG. 3A, content corresponding to one of the tabs is visible while content corresponding to other tabs is not, even though the content corresponding to the other tabs has been or is in the process of being received by the client device on which the browser application 300 is executing. On this particular example, for instance, the content corresponding to the stock ticker tab is visible, while the content corresponding to the other tabs is not. If a user wished to see the content corresponding to the top 25 scores tab, the user may select the top 25 scores tab using the appropriate user input, such as a mouse click or appropriate touch screen command or keyboard command. Upon selection of the top 25 scores tab, content corresponding to the top 25 scores tab would replace the content corresponding to the Stock Ticker tab 302 on the user's display, in accordance with an embodiment. Thus, upon selection by the user of the "Top 25 Scores" tab, the stock prices shown in FIG. 3A may be replaced with current scores of sporting events. While the current scores are displayed, a user device on which the browser application is executing may receive updated information regardless of whether the page of stock prices are displayed. In this manner, current information is readily available for display should the user select the "Stock Ticker" tab 302.

As noted above, content utilized by a browser application, or generally any application, may be static or dynamic. The content corresponding to the stock ticker tab, for example, may be dynamic in order to provide users with current stock price information without users having to manually cause the browser to re-request the content. Various techniques can be utilized in order to make this content dynamic. For instance, HTML code of an HTML document used to provide the content corresponding to the stock ticker tab may instruct the browser application 300 to request the content at periodic intervals, such as every 30 seconds. Other techniques, such as through the use of asynchronous JAVAScript and XML (Ajax), may also be used to cause the browsing application to request updated content. Plug-in applications may receive streaming or other content. Generally, any way of providing dynamic content to users may be utilized in accordance with various embodiments.

Figure 3B:
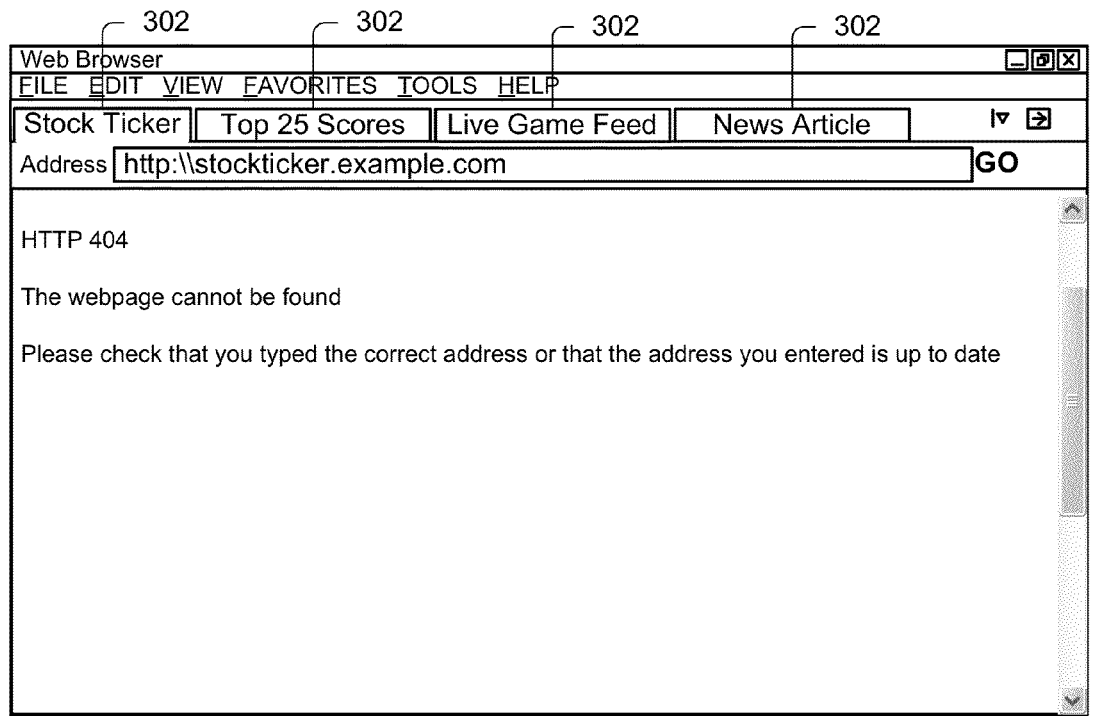

As discussed, providing dynamic content may be difficult in instances where there has been an inability to communicate with a network for a time period. Accordingly, FIG. 3B shows an illustrative example of a status of the browser application 300 when an ability to communicate with the Internet has ceased. In this particular instance, the browser application 300 has requested the content corresponding to the stock ticker tab and did not receive the content in response. As a result, in this particular example, the browser displays a hypertext transfer protocol (HTTP) 404 error, which is an error displayed upon the browser application's ability to communicate with the server, but an inability of the server to retrieve the requested content. The server may, for instance, retrieve the content from another location in a network and a network connection to the other location may have become inoperable. Generally, once an HTTP 404 error has been received, the requested content is no longer updated absent manually provided instructions by the user. Thus, in the example shown in 3B, because the HTTP 404 error does not include instructions for requesting content for the Stock Ticker tab 302, the stock price content corresponding to the stock ticker tag may not appear unless the user provides instructions to the browser application 300 to request the content again at a time when communication with the network has been restored.

In FIG. 3B, should the user select any of the tabs 302, the displayed HTTP 404 error message or similar message may be displayed for any of the tabs corresponding to dynamic content that is also affected by the reason for the error. However, static content may be displayed upon selection of a corresponding tab. For instance, in an embodiment, the news article content corresponding to the "News Article" tab is static and, therefore, should the user select the "News Article" tab, the content of the news article may appear. In some instances, some content may appear while others may not. For instance, web pages include both static and dynamic content using various techniques, such as HTML frames. Thus, often static content is provided with dynamic content, such as advertisements. Therefore, upon an inability to communicate with the network, content of the news article may appear upon selection of the "News Article" tab. However, dynamic advertisements provided in connection with the news article may not appear because of an inability to communicate with a server that provides the advertisements.

FIG. 3B shows an illustrative example of a browser application state upon receiving an HTTP 404 error, but other types of network problems may cause similar results. For example, a computer on which a browser is executing may lose the ability to connect with a network completely, such as if a network adaptor ceases functioning and/or if a wired or wireless network connection is lost. In such instances, dynamic content may cease being updated, except for perhaps dynamic content stored locally on a computing device in the form of an HTML, XML, or other type of file. As another example, a browser application may have an ability to store a tab state such that, if a browser application is closed or is terminated by an operating system, upon restarting the browser, a user may be provided an opportunity to have the tabs of the browser appear in the previous state, which may include re-requesting content from appropriate servers. If the browser was restarted during occurrence of a network problem and attempts to provide content according to previous tab states, in this instance, content corresponding to one or more of the tabs may not be received. An HTTP 404 error or other error may occur instead, depending on the nature of the network problem. In such instances, errors may occur not only for dynamic content, but for static content as well except, perhaps, in cases where static or dynamic content is retrieved from a local data store of a computer on which the browser application is executing. In such instances, and generally in other instances as well, embodiments of the present invention may be used to refresh tabs corresponding to static content as well as dynamic content.

Figure 4:
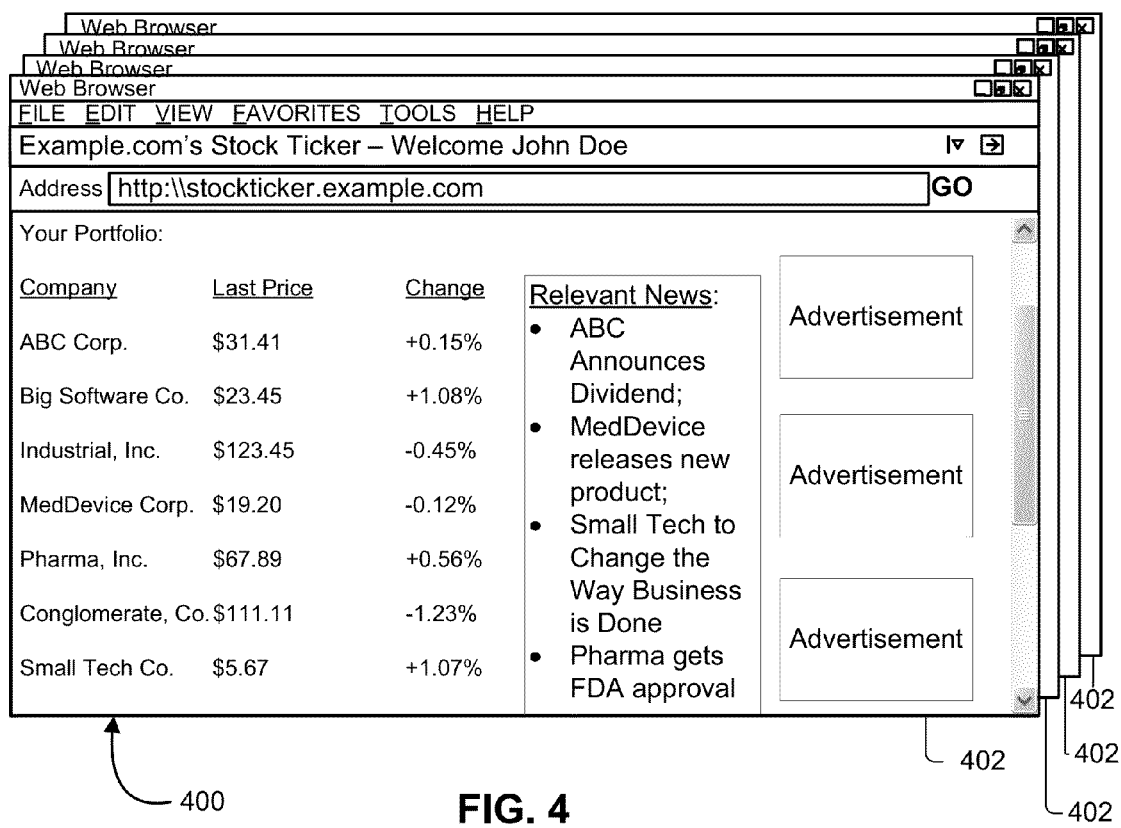
FIG. 4 shows a collection of browser application presentation surfaces that may be collectively used to practice the invention, in accordance with an embodiment.
Figure 5:
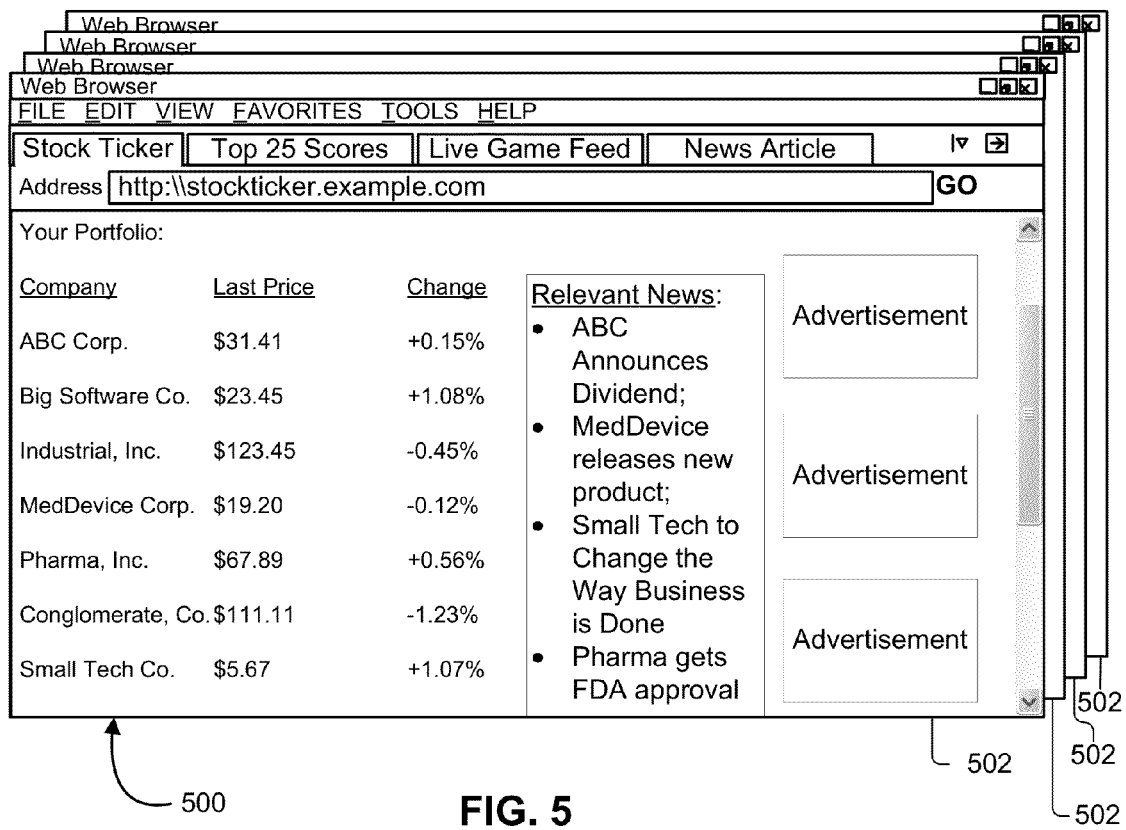
FIG. 5 shows a collection of browser application presentation surfaces, at least one of which utilizes a tab feature, in accordance with an embodiment.

As discussed, an application may utilize multiple presentation surfaces. Accordingly, FIG. 4 shows a collection 400 of presentation surfaces 402 in accordance with an embodiment. Each presentation surface may include corresponding content. The content for each of the presentation surfaces 402 may be different. As shown by the topmost presentation surface 402, which includes content described above in connection with FIGS. 3A and 3B, content of a presentation surface may be dynamic or static. In the example shown in FIG. 4, each presentation surface 402 has content corresponding to content of a corresponding web page. However, as shown in FIG. 5, which shows a collection 500 of presentation surfaces 502 of a browser application, a presentation surface may include a tab feature even when multiple presentation surfaces are utilized for an application.

Figure 6:
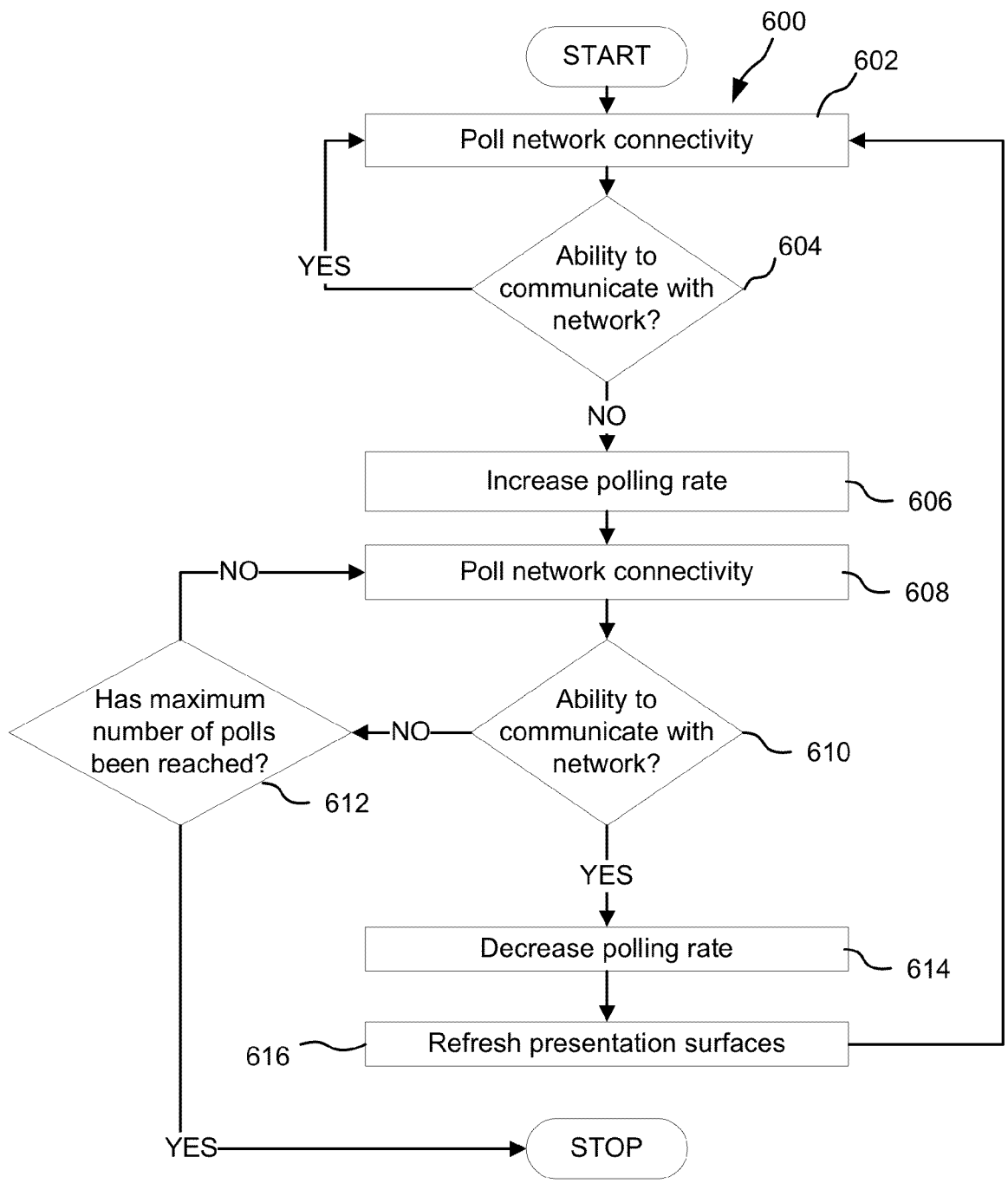
FIG. 6 shows a flowchart for a process of maintaining current content, in accordance with an embodiment.

FIG. 6 shows a flowchart of an illustrative process 600 for maintaining current content in accordance with an embodiment. The process 600, or any process described herein, or variation thereof, may be performed under the control of one or more computer systems configured with executable instructions. Executable instructions may be stored collectively on one or more computer-readable storage media. The process depicted in FIG. 6 (and any other methods described herein, or variations thereof) may be implemented by software (e.g., code, instructions, program) executing on a processor, by hardware, or combinations thereof. The software may be stored on a computer-readable storage medium, for example, in the form of a computer program comprising a plurality of instructions executable by one or more processors.

In an embodiment, network connectivity is polled 602 in accordance with an embodiment. Polling network connectivity is any activity that enables a determination whether a computing device has an ability to communicate with another device over a network. Polling network connectivity may be done in many ways. In an embodiment, a browser application polls a computer system on which the browser application is executing in order to receive information regarding the status of network connectivity; that is, whether communication with another device on the network is able to be conducted. For instance, a browser application may utilize an application programming interface (API) of an operating system in order to poll network connectivity. Polling network connectivity may involve sending a request for a connectivity status to one or more devices on a computer system on which the browser application is executing and receiving a response. The device may be, for instance, a network adaptor of a computer system.

Once the network connectivity has been polled, in an embodiment, a determination is made 604 whether there is an ability to communicate with the network. If there is an ability to communicate with the network, the network connectivity is polled 602 again. A period of time may pass before the network connectivity is polled 602, which may be several seconds, several minutes, or generally any time period. In this manner, as long as an ability to connect with the network is maintained, network connectivity is checked perhaps periodically. If there is not an ability to communicate with the network according to the determination, in an embodiment, then a rate of polling is increased 606 in accordance with an embodiment and the network connectivity is polled 608 again, according to the increased rate. In this manner, while there is an inability to communicate with the network, polling of network connectivity is performed more often than when there is an ability to communicate with the network in order to conserve resources involved in polling network connectivity unnecessarily, but so that content is more quickly refreshed after a temporary inability to communicate over the network.

When the network connectivity is polled 608 at the increased polling rate, a determination is made 610 whether there is an ability to communicate with the network. If there is no ability to connect with the network, a determination may be made 612 whether a maximum number of polls has been reached, where the maximum number of polls is a maximum number of attempts to determine whether there is an ability to communicate with the network that may be made while there is an inability to communicate with the network. If the maximum number of polls has not been reached, then the network connectivity is polled 608 again in an embodiment. In this manner, if a computer system is unable to communicate with a network for a long period of time, then the computer system ceases polling in order to conserve resources. If, however, a determination 610 is made that there is an ability to communicate with the network, then the polling rate is decreased 614 in the embodiment and one or more presentation surfaces are refreshed 616. For instance, all tabs of all presentation surfaces of a browser application may be refreshed. In some instances, fewer than all tabs of all presentation surfaces of a browser application are refreshed. For instance, only tabs and/or presentation surfaces identified as corresponding to dynamic content may be refreshed.

Figures 7, 8:
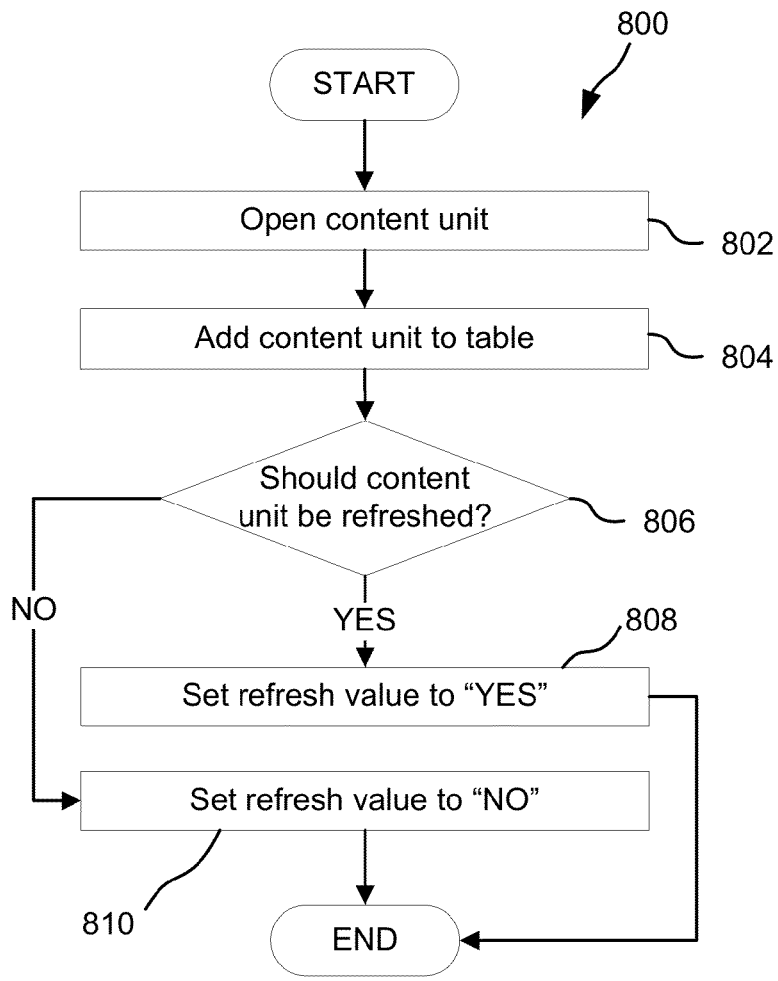
FIG. 7 shows a table which may be used to track content for refreshing subsequent to restoration of communication with a network, in accordance with an embodiment.
FIG. 8 shows a flowchart for a process of maintaining the table of FIG. 7, in accordance with an embodiment.

FIG. 7 shows an illustrative example of a table 700 that may be used to store information regarding tabs of a browser application to be restored upon restoration of an ability to communicate with a network. The table 700 may be created conditional to a global setting for taking advantage of an option for automatic tab refreshing. The global setting may have a default value of "false," where the table 700 is not created or, alternatively, where the table 700 is created but values in table, as discussed more fully below, are set such that tabs are not automatically refreshed in accordance with various embodiments. A user may, such as through an "options" feature of the browser application, change the global setting to "true," where one or more embodiments of the present invention are be implemented. The contents of the table 700 may be stored in memory of a computing device on which a browser application is executing. In an embodiment, a local extensible markup language (XML) file may used to store the information of the table 700, or variations thereof, or other data structures configured to store applicable information for implementing various embodiments of the invention. The table 700, in an embodiment, includes three columns, the first which is a "Browser Window" column. A browser window, in an embodiment, is a presentation surface of a browser application that includes one or more navigational objects provided by the browser application. In this example, browser windows are enumerated. The enumeration of browser windows may be according to the order in which the browser windows were created during execution of the browser application. Thus, in this example shown in FIG. 7, browser windows are given positive integer values.

Each browser window may include one or more tabs; accordingly, a second column of the table 700 is a "Tab" column. In this example, the tabs of each browser window are enumerated and a value of the enumeration appears in the column. The tabs may be enumerated according to the order in which the tabs were created using the browser application, the order in which the tabs appear on a screen when displayed, or in any suitable manner. For convenience, in this particular example, if a browser window does not include any tabs, for example, because the browser window is used only for display of content of a single web page, a value of "1" is used. A third column of the table 700, labeled as a "Refresh" column, identifies whether or not a tab of a browser window should be refreshed upon restoration of network connectivity. In this example, values in the "Refresh" column include values of "Yes" or "No," although other values may be used, such as Boolean values. A "Yes" value, in an embodiment, indicates that corresponding content should be refreshed upon restoration of network connectivity whereas a "No" value indicates that corresponding content should not be refreshed upon restoration of network connectivity. The browser application may incorporate a global setting, changeable by users that determines what values in the "Refresh" column are set to "Yes." Alternatively, the browser application may incorporate a global setting, changeable by users that determines what values in the "Refresh" column are set to "No." Generally, whether or not a table such as the table 700 is used, embodiments of the invention may incorporate a global setting that is changeable by users for dictating a default value for all tabs.

In the illustrative example of FIG. 7, each row of the table 700 corresponds to a browser window/tab combination. For example, the first row of the table 700 (excluding the row of labels) corresponds to the first tab of the first browser window, since the values in the intersection of the first row with both the "Browser Window" column and "Tab" column are "1." Similarly, the second row of the table 700 corresponds to the second tab of the first browser window since the values in the intersection of the second row with the "Browser Window" and "Tab" columns in the table 700 are "1" and "2," respectively. In this example, the table 700 shows information for seven browser windows total and nine tabs distributed among the seven browser windows.

To see how the table 700 might look in connection with the example provided in FIG. 5, the topmost presentation surface 502 is presented as having four tabs. If numbering the tabs according to order of appearance on a screen, the "Stock Ticker" ticker tab would be the first tab while the "Top 25 Scores" tab would be the second tab, the "Live Game Feed" tab would be the third tab, and the "News Article" tab would be the fourth tab. Four rows of a table, in an embodiment, would be included for the presentation surface 502, each row having the same value for the presentation surface in the "Browser Window" column.

Returning to FIG. 7, in an embodiment, values in the "Refresh" column of the table 700 indicate whether a corresponding tab of a browser window should be refreshed upon restoration of network connectivity. A set of one or more criteria may applied to content of a tab of a browser window in order to determine whether or not the tab should be refreshed upon detection of restoration of network connectivity. Criteria may relate to indications that content is likely dynamic or static. Criteria may relate to a variety of aspects of content, such as whether the content itself includes metadata identifying itself as dynamic, protocols used to transfer content, and the like. For instance, a tab having content retrieved using HTTP may be given a "Yes" value in an appropriate location in the "Refresh" column unless other criteria indicate that a "No" value should be used. On the other hand, content of a tab that was transferred using a file transfer protocol (FTP) may be given a "No" value in an appropriate location of the "Refresh" column unless other criteria indicate that a "Yes" value should be used. In another embodiment, a browser application may monitor whether a tab's content is refreshed independent of user input and, if it is determined that a tab's content is refreshed independent of user input, then a value in the appropriate location in the "Refresh" column may be set to "Yes" if the value was not already yes. Similarly, a browser application may monitor whether a tab's content is not refreshed independent of user input over a period of time (such as a minute) and if it is determined that the tab's content is not refreshed independent of user input over the period of time, then the value in an appropriate location in the "Refresh" column may be set to "No" if it is not "No" already. Tabs may be given a "Yes" value as default until criteria indicate that the value should be "No." Generally, any method of identifying whether tabs should be refreshed may be used.

In an embodiment, when a browser application detects a restored ability to communicate with a network, such as in a manner according to the process 600 described above in connection with FIG. 6 or another process, the browser references the table 700 of FIG. 7 (or similarly configured table) to determine which tabs to refresh. In particular, for each tab and browser window combination for which a "Yes" appears in the "Refresh" column of the table 700, the browser application may send a request to an appropriate server for content. The browser application may do nothing for browser window/tab combinations in the table 700 for which a "No" value appears in the "Refresh" column. In this manner, the likelihood of unnecessarily refreshing a tab, thereby using unnecessary bandwidth, is reduced.

FIG. 8 shows a flowchart for an illustrative process 800 for maintaining the table of FIG. 7, or a similarly configured table, in accordance with an embodiment. In an embodiment, a content unit is opened 802 in accordance with an embodiment. As used in this description of FIG. 8, a content unit is content corresponding to a particular tab of a particular browser window. Opening a content unit may be performed in several ways. For instance, a browser application may be opened by a user through user input or by another application in order to retrieve and display content. As another example, a user may, through user input, instruct the browser application to open a new tab. In an embodiment, when the content unit is opened, information corresponding to the content unit is added 804 to the table. Thus, if a new browser window is opened as part of opening the content unit, a new row corresponding to the browser window may be added at the bottom of the table. If the browser window is opened with multiple tabs, a row may be added to the table for each of the tabs in combination with the browser window. For instance, if the table 700 shown in FIG. 7 is stored in memory and, subsequently a browser window having at most one tab is opened, a row is created that has an "8" in the "Browser Window" column and a "1" in the "Tab" column. Similarly, beginning with the table 700 of FIG. 7, if a second tab of the third browser window is opened, a row having a "3" in the "Browser Window" column and a "2" in the "Tab" column is added to the table 700, such as by appending the row to the bottom of the table or inserting the row immediately below the row having "3" in the "Browser Window" column and "1" in the "Tab" column. Rows of the table 700 may be shifted accordingly.

Turning to FIG. 8, a determination 806 is made whether or not the content unit should be refreshed, and if the determination is positive, the refresh value is set 808 to yes. If the determination is negative, then the refresh value is set to "No" in an appropriate location in the "Refresh" column of the table 700, in accordance with an embodiment. As discussed, determining whether the content unit should be refreshed and setting a refresh value to "Yes" may be merely setting the refresh value to "Yes" as a default action. However, the determination of whether the contents should be refreshed can be performed in various ways. In an embodiment, as discussed, one or more criteria are applied to the contents in order to determine whether the content unit should be refreshed.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of maintaining current content, comprising:
    receiving, by a computer system, a first set of information from a plurality of information sources, the plurality of information sources comprising a first server and a second server, wherein the first set of information comprises information from the first server that corresponds to a first content unit and information from the second server that corresponds to a second content unit;
    monitoring communications between the computer system and a network;
    detecting, by the computer system and based at least in part on the monitoring, an ability to communicate over the network subsequent to an inability to communicate over the network;
    determining whether to refresh the first content unit based at least in part on first refresh criteria;
    determining whether to refresh the second content unit based at least in part on second refresh criteria; and
    responsive to detecting the ability to communicate over the network, requesting refresh information from one or more of the information sources, the refresh information to refresh at least some of the first set of information based at least in part on the determining of whether to refresh one or both of the first content unit and the second content unit.

2. The computer-implemented method of claim 1, wherein the information sources include at least one server operating a web page.

3. The computer-implemented method of claim 1, further comprising detecting the inability to communicate over the network.

4. The computer-implemented method of claim 1, wherein monitoring the ability of the computer system to communicate over the network includes periodically polling the computer system.

5. The computer-implemented method of claim 4, further comprising detecting, by the computer system, the inability to communicate over the network; and
wherein periodically polling the computer system includes polling the computer system at a first rate until detection of the inability to communicate over the network and, responsive to detecting the inability to communicate over the network, polling the computer system at a second rate that is higher than the first rate.

6. The computer-implemented method of claim 1, further comprising:
detecting, by the computer system, the inability to communicate over the network;
determining whether a set of conditions for stopping polling of the computer system is fulfilled; and
when the set of conditions is fulfilled, ceasing polling the computer system.

7. The computer-implemented method of claim 1, further comprising:
identifying a subset of content units to be refreshed upon restoration of a network failure; and
wherein requesting refresh information from one or more of the information sources includes requesting information solely for the subset.

8. A computer-readable storage medium, which is nontransitory, having stored thereon instructions that cause a computer system to maintain current content, the instructions comprising:
instructions that cause the computer system to utilize a network to
access a first set of information from a plurality from one or more information sources, the plurality of information sources comprising a first server and a second server, wherein the first set of information comprises information from the first server that corresponds to a first content unit and information from the second server that corresponds to a second content unit;
instructions that cause the computer system to detect an ability to communicate over the network subsequent to an inability to communicate over the network;
instructions that cause the computer system to determine whether to refresh the first content unit based at least in part on first refresh criteria;
instructions that cause the computer system to determine whether to refresh the second content unit based at least in part on second refresh criteria; and
instructions that cause the computer system to, responsive to detecting the ability to communicate over the network, request refresh information from one or more of the information sources, the refresh information to refresh at least some of the first set of information based at least in part on the determining of whether to refresh one or both of the first content unit and the second content unit.

9. The computer-readable storage medium of claim 8, wherein the information sources include at least one server operating a web page.

10. The computer-readable storage medium of claim 8, further comprising instructions that cause the computer system to detect the inability to communicate over the network.

11. The computer-readable storage medium of claim 8, further comprising instructions that cause the computer system to monitor an ability to communicate using the network by periodically polling the computer system.

12. The computer-readable storage medium of claim 11, further comprising:
instructions that cause the computer system to detect the inability to communicate over the network; and
wherein periodically polling the computer system includes polling the computer system at a first rate until detection of the inability to communicate over the network and,
responsive to detecting the inability to communicate over the network, polling the computer system at a second rate that is higher than the first rate.

13. The computer-readable storage medium of claim 8, further comprising:
instructions that cause the computer system to detect the inability to communicate over the network;
instructions that cause the computer system to determine whether a set of conditions for stopping polling of the computer system is fulfilled; and
instructions that cause the computer system to, when the set of conditions IS fulfilled, cease polling the computer system.

14. The computer-readable storage medium of claim 8,
further comprises comprising instructions that cause the computer to identify a subset of content units to be refreshed upon restoration of a network failure; and
wherein the instructions that cause the computer system to request refresh information from one or more of the information sources include instructions that cause the computer to request information solely for the subset.

15. A computer system configured to maintain current content, comprising:
one or more processors; and
memory including executable instructions that, when executed by the one or more processors, cause the one or more processors to at least:
utilize a network to access a first set of information from a plurality of information sources, the plurality of information sources comprising a first server and a second server, wherein the first set of information comprises information from the first server that corresponds to a first content unit and information from the second server that corresponds to a second content unit;
detect an ability to communicate over the network subsequent to an inability to communicate over the network;
determine whether to refresh the first content unit based at least in part on first refresh criteria;
determine whether to refresh the second content unit based at least in part on second refresh criteria; and
responsive to detecting the ability to communicate over the network, request refresh information from one or more of the information sources, the refresh information to refresh at least some of the first set of information based at least in part on the determining of whether to refresh one or both of the first content unit and the second content unit.

16. The computer system of claim 15, wherein the information sources include at least one server operating a web page.

17. The computer system of claim 15, wherein the memory further comprises executable instructions that cause the one or more processors to monitor an ability to communicate using the network by periodically polling the computer system.

18. The computer system of claim 17, wherein the memory further comprises executable instructions that cause the one or more processors to detect the inability to communicate over the network; and wherein periodically polling the computer system includes polling the computer system at a first rate until detection of the inability to communicate over the network and, responsive to detecting the inability to communicate over the network, polling the computer system at a second rate that is higher than the first rate.

19. The computer system of claim 15, wherein the memory further includes:

instructions that cause the computer system to detect the inability to communicate over the network;

instructions that cause the computer system to determine whether a set of conditions for stopping polling of the computer system are fulfilled; and instructions that cause the computer system to, when the set of conditions is fulfilled, cease polling the computer system.

20. The computer system of claim 15, wherein the memory further includes executable instructions that cause the one or more processors to identify a subset of content units to be refreshed upon restoration of a network failure; and wherein the instructions that cause the one or more processors to request refresh information from one or more of the information sources include instructions that cause the one or more processors to request information solely for the subset.

\* \* \* \* \*

UNITED STATES PATENT AND TRADEMARK OFFICE
CERTIFICATE OF CORRECTION

| | | |
|---|---|---|
| PATENT NO. | : 8,639,804 B2 | Page 1 of 1 |
| APPLICATION NO. | : 12/874554 | |
| DATED | : January 28, 2014 | |
| INVENTOR(S) | : Ramanathaiah et al. | |

It is certified that error appears in the above-identified patent and that said Letters Patent is hereby corrected as shown below:

In the Specification:

In column 10, line 62, after "may" insert -- be --.

In the Claims:

In column 15, line 30-31, in Claim 8, delete "nontransitory," and insert -- non-transitory, --, therefor.

In column 16, line 22, in Claim 13, delete "IS" and insert -- is --, therefor.

In column 16, line 25, in Claim 14, before "comprising" delete "comprises".

Signed and Sealed this
Twenty-fourth Day of June, 2014

Michelle K. Lee
*Deputy Director of the United States Patent and Trademark Office*